United States Patent [19]

Ortiz, Jr. et al.

[11] Patent Number: 4,937,421
[45] Date of Patent: Jun. 26, 1990

[54] LASER PEENING SYSTEM AND METHOD

[75] Inventors: Angel L. Ortiz, Jr., Scotia; Carl M. Penney, Saratoga Springs; Marshall G. Jones, Scotia; Carl E. Erikson, Schenectady, all of N.Y.

[73] Assignee: General Electric Company, Schenectady, N.Y.

[21] Appl. No.: 375,235

[22] Filed: Jul. 3, 1989

[51] Int. Cl.$^5$ .............................................. B23K 26/00
[52] U.S. Cl. ........................... 219/121.68; 219/121.69; 219/121.77
[58] Field of Search ....................... 219/121.68, 121.69, 219/121.65, 121.66, 121.76, 121.77, 121.6, 121.85

[56] References Cited

U.S. PATENT DOCUMENTS

| | | | |
|---|---|---|---|
| 4,673,795 | 6/1987 | Ortiz, Jr. | 219/121.6 |
| 4,681,396 | 7/1987 | Jones | 350/96.18 |
| 4,752,455 | 6/1988 | Mayer | 219/121.6 X |

OTHER PUBLICATIONS

R. T. Hodgson et al., "Ohmic Contacts Made by Lasers", *IBM Technical Disclosure Bulletin*, vol. 21, No. 10, p. 4286, Mar. 1979.
Justus et al., "Fluorescence Thermometry of Shocked Water", App. Phys. Lett., vol. 47, No. 11, 12/1/85.
Schoen et al., "Characteristics of Compressional Shocks Resulting from Picosecond Heating of Confined Foils", Appl. Phys. Lett., vol. 45, No. 10, 11/15/84.
Felix, "Laser-Generated Ultrasonic Beams", Rev. Sci. Instrum., vol. 45, No. 9, 9/74.
Fairand et al., "Laser Shock-Induced Microstructural and Mechanical Property Changes in 7075 Aluminum", J. Appl. Phys., vol. 43, No. 9, 9/72.

*Primary Examiner*—C. L. Albritton
*Attorney, Agent, or Firm*—John S. Beulick; James C. Davis, Jr.; Paul R. Webb, II

[57] ABSTRACT

A laser peening apparatus and method for peening a workpiece utilizing a laser beam is described. The system includes a foil aligned with a surface of the workpiece to be peened and lasing the aligned foil surface. The foil absorbs energy from the beam and a portion of the foil vaporizes, which creates a hot plasma within the foil. The plasma creates a shock wave which passes through the foil and peens the workpiece surface.

20 Claims, 5 Drawing Sheets

LASER PEENING SYSTEM AND METHOD

The present invention relates to peening a workpiece, and more specifically relates to a peening system and method which utilize a laser beam from a laser beam source to peen a workpiece surface.

BACKGROUND OF THE INVENTION

Peening, as understood in the art and as used herein, means to compress a portion of a surface by forming a depression or indentation on the surface. Peening equipment generally is utilized to create a compressively stressed protection layer at the outer surface of a workpiece. The protection layer considerably increases the resistance of the workpiece to fatigue failure.

One known type of peening is referred to as shot peening. Shot used in shot peening generally are spherical particles constructed from a hard metal. With shot peening systems, a stream of shot traveling at a high velocity is directed at an outer surface of a workpiece. Each shot particle that impacts with sufficient force upon the outer surface of the workpiece causes plastic deformation of the surface and a dimple is formed therein. In this manner, a compressively stressed layer is formed at the outer surface of the workpiece.

In order to accurately control a shot peening process and the results thereof, several variables must be accurately controlled. These variables include the size, shape and velocity of each shot particle. Systems and methods are available to control these variables, however, these systems increase the cost of the peening process. Moreover, it is very difficult to precisely and continuously control shot size, shape and velocity, and in practice, a percentage of deviation from predetermined values is tolerated. This leads to uncertainty as to the actual results of a shot peening process and earlier-than-predicted failure of the workpiece may occur. This is very undesirable because a replacement for the workpiece may not be readily available and causes loss of time and resources.

In operation, shot peening systems usually are very noisy and require an enclosed area with noise suppression. These systems also require ventilation systems for removal of dust particles. Noise suppression and ventilation systems further increase the cost of peening systems. Also, while peening a workpiece, it often is desirable to accurately peen only a specific area of the workpiece surface. With slot peening systems, however, stray shot sometimes undesirably peen a surface outside the specific area. In some instances, this stray peening may require that the entire workpiece be discarded.

OBJECTS OF THE INVENTION

It is therefore an object of the present invention to provide a peening system and method which overcome the shortcomings and disadvantages of known peening devices.

Another object of the present invention is to provide a peening system and method which more accurately control peening.

Still another object of the present invention is to provide a peening system and method which do not require noise suppression and ventilation systems.

Yet another object of the present invention is to provide a peening system and method which substantially minimize, if not eliminate, stray peening.

SUMMARY OF THE INVENTION

The present peening system and method utilize a laser beam from a laser beam source to peen a workpiece. A first embodiment of the present invention includes a fixture having a base plate and a substantially parallel cover plate spaced from the base plate. Each of the plates have substantially planar first and second surfaces, and the cover plate has a clearance opening therein.

A protection plate is disposed between the base plate and the cover plate. The protection plate is transparent and has substantially planar first and second surfaces. The first surface of the protection plate is proximate one surface of the cover plate and is positioned so as to prevent particles from traveling through the clearance opening in a direction from the base plate towards the cover plate.

A foil, constructed from a material such as copper and having substantially planar first and second surfaces, is disposed so its first surface is proximate the second surface of the protection plate. A portion of the copper foil is aligned with the clearance opening. A workpiece may be disposed between the foil and the base plate. Engagement means maintain the plates, foil and workpiece in position.

In operation, when a laser beam is applied through the clearance opening, the workpiece surface is peened. Specifically, the laser beam impinges on the copper foil and vaporizes a portion of the foil. The vaporization of the foil portion creates a hot plasma. As the plasma expands, an intense compressional wave passes through the foil and peens the workpiece surface.

A second embodiment of the present invention utilizes a laser source including at least one optical fiber for transmitting a laser beam to an output coupler. A single fiber or multiple fibers may be utilized depending upon the number of beams being used for peening. A transformation unit utilized in the second embodiment has elements which correspond to elements of the fixture of the first embodiment including a cover plate having a clearance opening, a protection plate and a foil. Robotic arms or like devices are used to place the coupler and the transformation unit in a desired position. More specifically, the robotic arms, during peening, hold the transformation unit so that the copper foil contacts the surface to be peened and align the output coupler with the clearance opening. A laser beam is transmitted by the optical fiber to the output coupler, and the beam then passes through the clearance opening and impinges on the foil to peen the workpiece. The robotic arm then positions the unit and coupler in alignment with another surface to be peened.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE INVENTION

Figure 1:
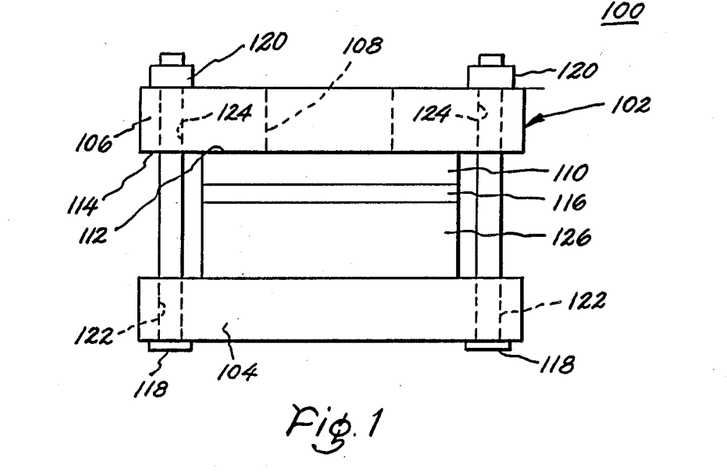
FIG. 1 is a side view of an embodiment of a laser peening system in accordance with the present invention.

As illustrated in FIG. 1, preferred embodiment 100 of the present invention includes a fixture 102 having a base plate 104 and a substantially parallel cover plate 106 spaced from base plate 104. The plates preferably are constructed from aluminum or a similar material which will not be substantially affected by a lasing process.

Figure 2:
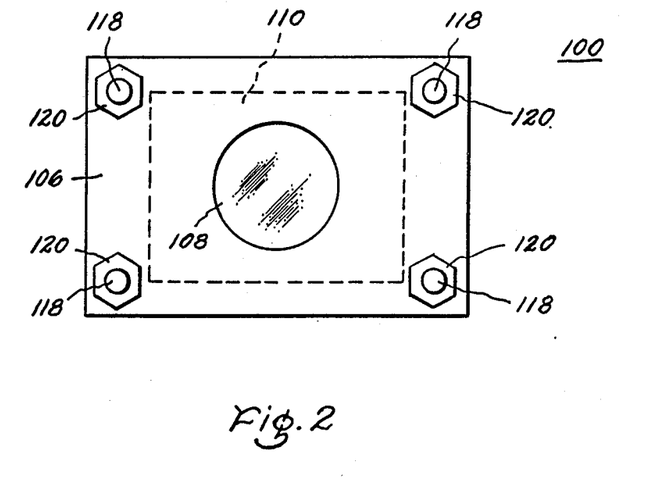
FIG. 2 is a top view of the laser peening system shown in FIG. 1.

An opening 108, sometimes referred to herein as a clearance opening, is located in the cover plate. Generally, the clearance opening is centrally located in the cover plate as shown in FIG. 2, and clearance opening 108 has a diameter which is less than the length and less than the width of the cover plate. The dimensions of the clearance opening generally are selected to allow the desired surface area of the workpiece to be peened without having to move the workpiece relative to the fixture.

A protection plate 110 is disposed between base plate 104 and cover plate 106. One surface 112 of the protection plate is proximate surface 114 of the cover plate. The protection plate generally is constructed from glass and, for example, may be a microscope glass slide or a quartz plate. Protection plate 110 is positioned so that it prevents particles from traveling through the clearance opening in a direction from base plate 104 towards cover plate 106. The protection plate therefore protects the focusing lens and other components of a laser beam source.

A foil 116, generally constructed from copper and having a thickness of about 2 mils, is disposed adjacent the protection pate, and a portion of the copper foil is aligned with the clearance opening. The material from which the foil is constructed and the foil thickness may be varied depending upon the desired depth and size of indentation, i.e. dimple, required in the workpiece and the desired speed at which the peening process is to be completed. Other parameters of the peening process also may be controlled by selecting an appropriate foil 116. The foil, for example, may be constructed from aluminum, titanium, Inconel alloy, stainless steel, carbon steel, or other materials. The plates and foil are maintained in position by engagement means shown as threaded bolts 118 and nuts 120. Base plate 104 and cover plate 106 include bolt holes 122 and 124 respectively.

Before beginning the peening process, bolts 118 are inserted through bolt holes 122 of base plate 104. A workpiece 126 is disposed on the base plate and foil 116 is disposed on the workpiece. Protection plate 110 is disposed on foil 116, and then the cover plate is disposed on the protection plate so that bolts 118 pass through bolt holes 124. The surface of the workpiece to be peened is aligned with the clearance opening, and threaded nuts 120 are tightened against cover plate 106 so that the plates, the foil and the workpiece are maintained in the selected position.

Figure 3:
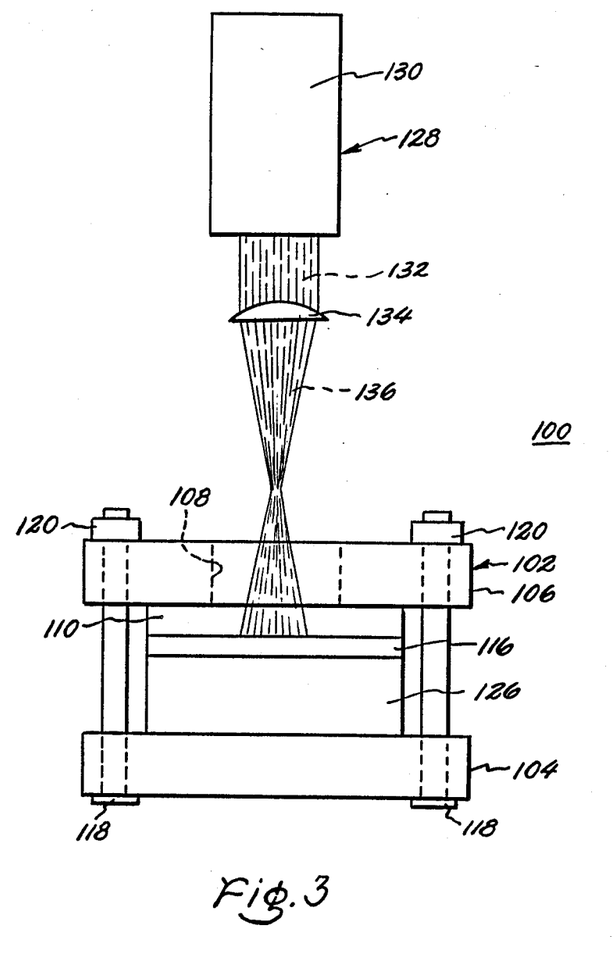
FIG. 3 illustrates the laser peening system of FIG. 1 including a laser beam source.

FIG. 3 illustrates the present invention including a laser beam unit 128 having a laser beam source 130 emitting a laser beam 132. After the workpiece and the fixture are positioned as described above, laser beam source 130 and a selected focal lens 134 are aligned with clearance opening 108. The wavelength of laser beam 132 output by source 130 and focal lens 134 are selected so as to control the laser peening depth, size and processing speed.

Laser beam source 130 may, by way of example, be a commercially available Molectron Model MY 34-10 Nd:YAG laser system capable of delivering approximately one joule (J) in ten to thirty nanoseconds. The laser pulse length may be set to about ten nanoseconds. The focal lens may have a selected standoff distance of 23 cm from the workpiece.

In operation, laser beam pulse 132 is output by source 130. Lens 134 focuses the beam and the focused beam 136 passes through clearance opening 108 and protection plate 110. The focused laser beam then is partially absorbed and partially reflected by foil 116. The partially absorbed energy from the pulse creates a hot confined plasma within the foil. As the plasma expands it creates a compressional shock wave passing through the foil. The shock wave impacts against and peens workpiece 126. Protection plate 110 prevents particles of the foil from damaging lens 134 and source 130, and plate 110 also serves to contain the plasma.

The above-described process is repeated to peen the desired surface area of the workpiece. Specifically, the laser beam source could be moved so that the laser beam is aligned with a different workpiece surface but still in alignment with a portion of the clearance opening. Also, the workpiece may be re-positioned so that a different workpiece surface is aligned with the clearance opening.

Depending upon the workpiece material, many parameters of the present invention may be selected to control the peening process. For example, an operator may select the laser pulse energy, laser pulse length, focal lens, working distance, foil thickness, foil material, protection plate type and thickness, and fixture clamping pressure to control the peening process. More particularly, laser pulse energy and laser pulse length directly affect the peak power density of fhe laser beam. The peak power density is directly related to the amount of laser energy placed on the foil surface per unit of time. The amount of energy placed on the foil surface affects the depth of each dimple and the speed of the peening process.

The type and characteristics of the focal lens, as well as the working distance, i.e. the distance from the output end of the optical fiber to the workpiece, can be used to control the focus spot size of the laser beam on the foil. For example, at a constant energy level, a smaller spot on the foil will cause the dimple to be deeper. The foil thickness also affects the depth of the dimple. Generally, and with all other parameters constant, a thicker foil will produce a more shallow dimple. Further, the foil type affects the laser-to-foil interaction, and by way of example, with all other parameters being constant, a stainless steel foil generates a deeper dimple than an aluminum foil because aluminum has a higher reflectivity characteristic than stainless steel. Aluminum, therefore, will not absorb as much energy as stainless steel. The protection plate type and thickness also may be selected to control the peening process. Specifically, and with all other parameters constant, a protection plate which is not flexible will not absorb much of the force created in the foil and a deeper dimple will be formed in the workpiece. On the other hand, a more flexible protection plate will absorb some of the force and a more shallow dimple will be formed. The fixture clamping pressure also affects the peening process in that the clamping pressure affects the amount of plasma trapped and transformed into mechanical force to peen the workpiece. Specifically, with all other parameters being constant, a higher magnitude clamping pressure will cause a deeper dimple to be formed.

The laser peening system illustrated in FIGS. 1-3 was constructed using a Moletron Model MY 34-10 Nd:YAG laser source capable of delivering approximately 1 J. in 10 to 30 nsecs. The laser pulse length was set to 10 nsec., and a 20 cm. focal length lens with a sample standoff distance of 23 cm. from the lens was used. The foil was a 0.002 inch thick copper foil and the protection plate was a glass microscope slide plate. the clearance opening in the cover plate had a one inch diameter and the beam was focused 3 mm above the work surface. The workpiece was an aluminum sheet 0.127 inches thick. This workpiece ws subjected to three pulses of laser energy. Each pulse had a power of 7.8 watts at 10 Hz. A 1 mm×1 mm dimple 73 microns deep was formed in the workpiece surface. Visual inspection under a microscope showed no evidence of surface melting. It was found that the energy of the laser pulse, as well as other parameters, should be controlled in order to prevent surface melting of the workpiece. Also, once the dimple is formed, the glass plate, i.e. the protection plate, generally was discarded. Copper from the foil had damaged the glass plate during the peening process.

The present invention provides many advantages in that it eliminates the need in known shot peening systems to continuously control shot size, shape and velocity. The present laser peening system and method also provide accurate control of the peening process thereby substantially preventing earlier-than-predicted failure of the workpiece due to unpredictable peening operations. Further, the present invention does not require noise suppression and ventilation systems and substantially, if not entirely, eliminates stray peening.

Figure 4:
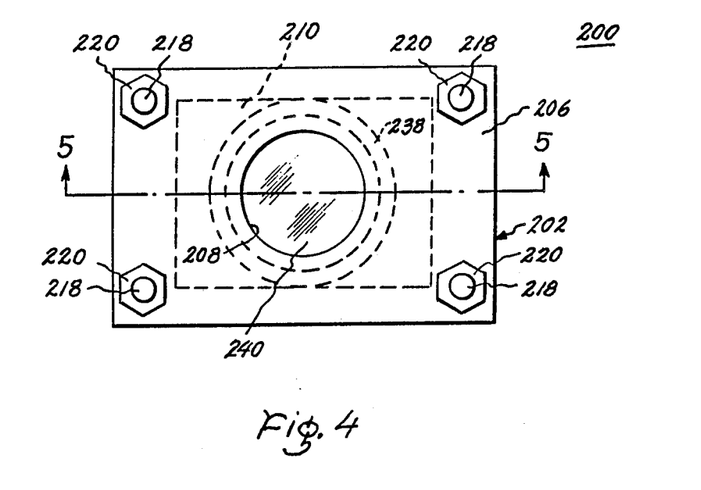
FIG. 4 is a top view of another embodiment of the present laser peening system.
Figure 5:
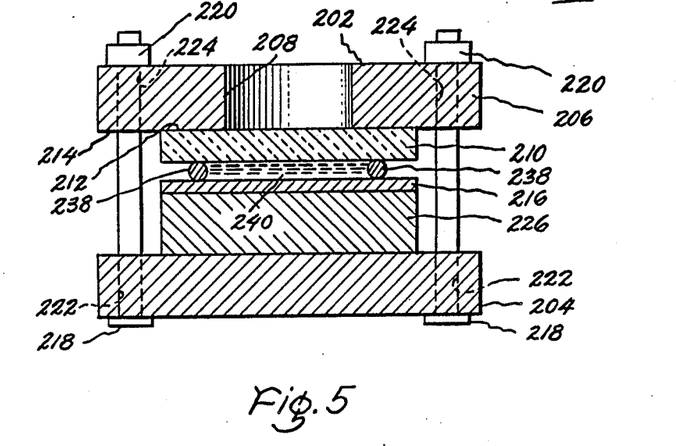
FIG. 5 is a cross-section view of the embodiment of FIG. 4 through line 5—5.

FIGS. 4 and 5 illustrate another embodiment 200 of the present laser peening system. Components of embodiment 200 have the same last two digits as the corresponding component, if any, of embodiment 100 of FIG. 1. The embodiment shown in FIGS. 4 and 5 includes an o-ring 238 disposed between protection plate 210 and foil 216. A liquid 240, such as distilled water, is contained within o-ring 238. The distilled water is utilized to cool the system components and to aid in preventing surface melting of the workpiece.

The embodiment illustrated in FIGS. 4-5 was constructed using a workpiece of oxygen free copper 0.122 inches thick. The foil was a 0.002 inch thick copper foil and the protection plate was a glass microscope slide. Distilled water was disposed in the o-ring and the workpiece was subjected to one laser pulse having an energy of 0.28 Joules. The dimple formed in the workpiece surface was approximately 0.5 mm in diameter and 4.5 microns deep. Visual inspection of the dimpled area showed no signs of surface melting on the sample. The copper foil, however, was displaced from the workpiece surface after the laser pulse. Lifting of the copper foil is not desirable because intimate contact between the foil and workpiece is required for more efficient transfer of energy. Therefore, the foil generally should be replaced or realigned after each pulse when utilizing embodiment 200.

Figure 6:
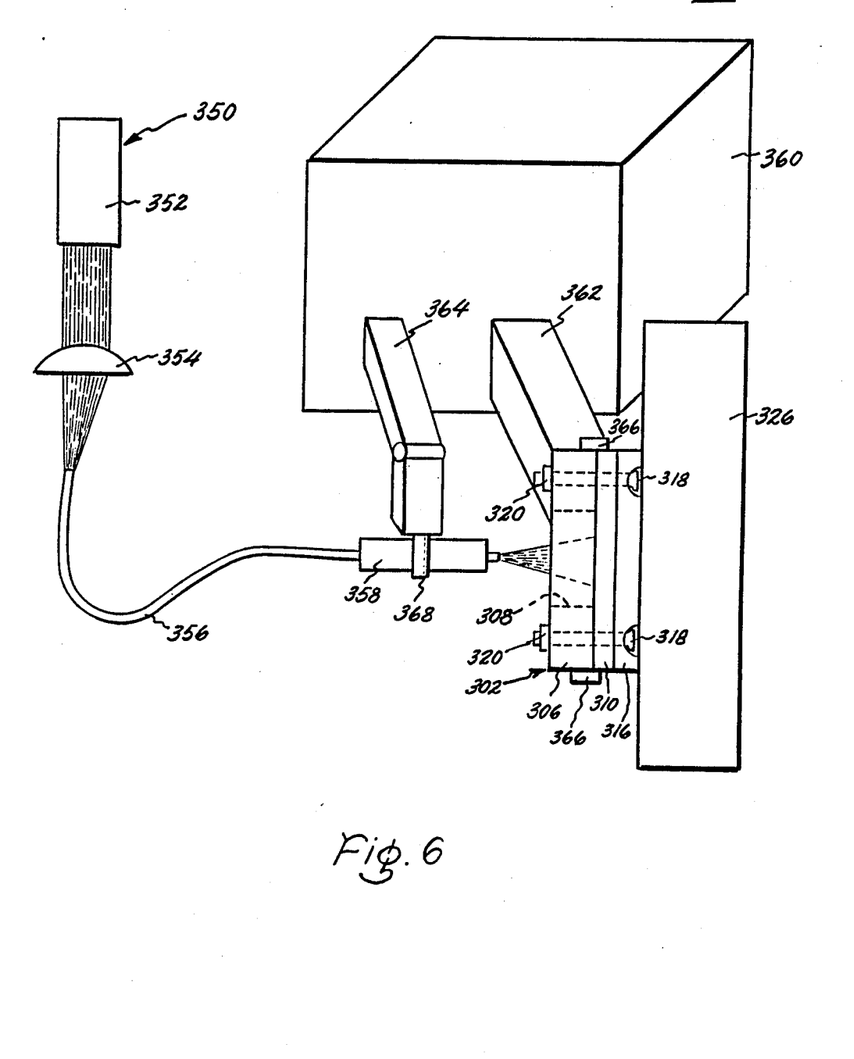
FIG. 6 illustrates another embodiment of the present peening system including a laser source having a power optical fiber.

Embodiment 300 illustrated in FIG. 6 includes a transformation unit 302 which substantially corresponds to the fixture illustrated in FIGS. 1-5 except that unit 302 does not include a base plate. Components of unit 302 have the same last two digits as the corresponding component, if any, of fixture 102. Embodiment 300 also includes a laser unit 350 which is related to laser units disclosed in U.S. Pat. Nos. 4,681,396 and 4,673,795 assigned to the instant assignee. Laser unit 350 includes source 352 and lens 354 which may be utilized with transformation unit 302 to provide greater flexibility. Specifically, the laser unit in FIG. 6 includes a power fiber 356 which transmits a focused beam to the output of a coupler 358. The beam then is transmitted through unit 302 and the workpiece is peened. Robotic unit 360 includes arms 362 and 364 which are utilized to move transformation unit 302 and coupler 358, respectively, relative to workpiece 326. Arm 362 includes a clamp 366 for holding unit 302, and arm 362 maintains foil 316 proximate the surface to be peened. Arm 364 includes a clamp 368 for holding output coupler 358, and the output coupler and the transformation unit can be moved, via the robotic arms, to a desired location. By utilizing the peening system of embodiment 300, a larger surface area of workpiece 326 may be peened in a shorter time period. Further, workpiece surface areas which may otherwise be difficult to access are more readily peened because unit 302 and coupler 358 are easily moved into a desired position. Workpiece 326 generally will be part of a larger body, such as an engine block, which will provide support therefor during the peening process.

Figure 7:
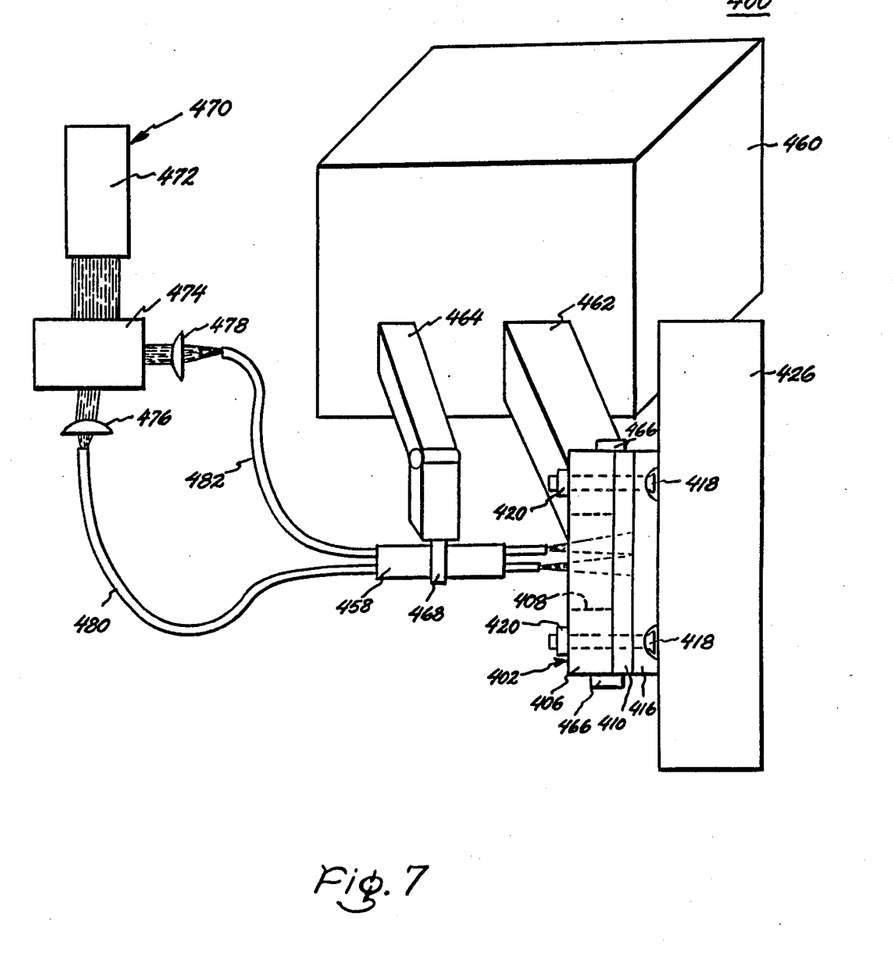
FIG. 7 illustrates the present laser peening system including a laser source having multiple power optical fibers.

Embodiment 400 in FIG. 7 is substantially similar to embodiment 300 of FIG. 6 and components of embodiment 400 have the same last two digits as the corresponding component, if any, of embodiment 300. In FIG. 7, however, laser beam unit 470 includes a source 472, a beam splitter 474, and lenses 476 and 478 for focusing a beam into fibers 480 and 482, respectively. Laser unit 470 also is related to units disclosed in previously-identified U.S. Pat. Nos. 4,681,396 and 4,673,795. In unit 470, each fiber transmits a laser beam to output coupler 458. Thus, a plurality of laser beams are applied to the foil and different workpiece areas will be simultaneously peened. Embodiment 400 therefore further reduces the time required to peen a workpiece. Different wavelength laser beams may be simultaneously applied to the workpiece to provide the operator greater flexibility in controlling the peening process.

Embodiments 300 and 400 of FIGS. 6 and 7 enable an operator to more accurately control the peening process by providing the operator with greater control over the laser beam. Specifically, the laser beam output by the source can be more accurately monitored and controlled by transmitting the beam through selected injection lenses and fibers. Sensors also could be placed within the beam splitter and output coupler to detect certain parameters of the beam to assure that the beam satisfies predetermined characteristics. For example, an intensity sensor disposed within the beam splitter unit could be utilized to determine whether the beam is being input into the cable or whether the beam is reflecting off the walls in the splitter unit.

While specific embodiments of the present invention have been described herein, it is to be understood that these are for illustrative purposes only. Various modifications and adaptations will be apparent to those of skill in the art. Accordingly, reference should be made to the claims appended hereto in order to determine the full scope of the present invention.

What is claimed is:

1. A peening apparatus for peening a workpiece, said peening apparatus comprising:
   an assembly comprising a foil having first and second surfaces, means for maintaining said second surface of said foil proximate the workpiece surface to be peened, and a cover plate having a clearance opening therein, said cover plate having first and second surfaces, a protection plate having first and second surfaces, said first surface of said protection plate disposed proximate one of said surfaces of said cover plate, said foil being disposed between said cover plate and the workpiece;
   a laser unit comprising a laser beam source for generating at least one laser beam and means for transmitting said beam through said clearance opening to vaporize a portion of said foil;
   whereby a plasma is created within said foil upon vaporizing said foil portion, said plasma generating a force transmitted through said foil to peen the workpiece surface.

2. A peening apparatus in accordance with claim 1 wherein said first and second surfaces of said cover plate are substantially planar and the dimensions of said clearance opening are selected to allow the selected area of the workpiece to be peened.

3. A peening apparatus in accordance with claim 1 wherein said cover plate is constructed from aluminum.

4. A peening apparatus in accordance with claim 1 wherein said protection plate is transparent and said first and second surfaces of said protection plate are substantially planar.

5. A peening apparatus in accordance with claim 4 wherein said protection plate is constructed from glass.

6. A peening apparatus in accordance with claim 1 wherein said foil comprises a copper foil, and said first and second surfaces of said foil are substantially planar.

7. A peening apparatus in accordance with claim 1 wherein the thickness and material of said foil are selected to control peening.

8. A peening apparatus in accordance with claim 1 wherein means for maintaining said second surface of said foil proximate the workpiece surface to be peened comprises:
   a first controllable arm member of a robotic device, said arm including a first clamp for holding said assembly.

9. A peening apparatus in accordance with claim 1 wherein said transmitting means of said laser beam unit comprises an output coupler and an optical fiber for transmitting said beam from said laser beam source to said coupler.

10. A peening apparatus in accordance with claim 9 further comprising:
    a robotic device including a first controllable arm member including a first clamp for holding said assembly and a second controllable arm member including a second clamp for holding said output coupler whereby said assembly and said clamp are movable relative to said workpiece to peen the workpiece surface.

11. A peening apparatus in accordance with claim 1 wherein said laser unit includes a beam splitter for developing a plurality of laser beams, and said transmitting means for said laser beam unit comprises an output coupler and a plurality of optical fibers, each of said laser beams being transmitted through one of said fibers to said output coupler.

12. A peening apparatus in accordance with claim 11 further comprising:
    a robotic device including a first controllable arm member including a first clamp for holding said assembly and a second controllable arm member including a second clamp for holding said output coupler whereby said assembly and said clamp are moveable relative to said workpiece to peen the workpiece surface.

13. A peening apparatus in accordance with claim 11 wherein each of said laser beams has a predetermined wavelength.

14. An assembly for a peening apparatus of the type which utilizes a laser beam from a laser beam source to peen a workpiece, said assembly comprising:
    a foil having first and second surfaces;
    a cover plate having first and second surfaces, said cover plate further having a clearance opening therein being aligned with a portion of said foil, said foil being positioned between said cover plate and the workpiece, and said second surface of said foil being proximate the workpiece surface to be peened;
    a protection plate having first and second surfaces, said first surface of said protection plate being proximate one surface of said cover plate;
    engagement means for maintaining said plates and said foil in position;
    whereby the workpiece surface disposed proximate said second surface of said foil is peened when the laser beam is applied through said clearance opening.

15. An assembly in accordance with claim 14 wherein said cover plate and said protection plate and said foil have bolt holes therein and said engagement means comprise at least one threaded bolt and a nut.

16. An assembly in accordance with claim 14 further comprising:
    a base plate having first and second surfaces, said base plate being substantially parallel to said cover plate and said first surface of said base plate disposed so that a workpiece may be positioned between said second surface of said foil and said first surface of said base plate.

17. An assembly in accordance with claim 14 further comprising:
    an o-ring disposed between said protection plate and said foil, a liquid being disposed within said o-ring for cooling said assembly.

18. A method of peening a workpiece comprising the steps of:
    selecting a foil which absorbs energy from a laser beam;
    aligning said foil with a surface of the workpiece to be peened;
    selecting laser beam unit parameters; and
    lasing the surface of said foil aligned with the workpiece with the laser beam output by said laser beam unit;
    whereby energy from the laser beam is absorbed by the foil thereby vaporizing a portion of said foil and creating a shock wave passing therethrough which impacts against and peens the workpiece.

19. A method of peening a workpiece in accordance with claim 18 wherein the step of selecting said foil comprises:
   selecting a foil material type; and
   selecting foil dimensions to control dimple depth and processing speed.

20. A method of peening a workpiece in accordance with claim 18 wherein the step of selecting laser beam unit parameters comprises:
   selecting a focal lens;
   selecting a magnitude of the output beam; and
   selecting a wavelength of the output beam.

* * * * *